US 10,919,646 B2

(12) United States Patent
Chen et al.

(10) Patent No.: US 10,919,646 B2
(45) Date of Patent: Feb. 16, 2021

(54) UNMANNED VEHICLE

(71) Applicant: SZ DJI TECHNOLOGY CO., LTD., Shenzhen (CN)

(72) Inventors: Zihan Chen, Shenzhen (CN); Dahu Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 176 days.

(21) Appl. No.: 16/042,540

(22) Filed: Jul. 23, 2018

(65) Prior Publication Data

US 2018/0346147 A1   Dec. 6, 2018

Related U.S. Application Data

(63) Continuation of application No. PCT/CN2016/072228, filed on Jan. 26, 2016.

(51) Int. Cl.
| *B64D 47/08* | (2006.01) |
| *G03B 15/00* | (2006.01) |
| *G03B 17/56* | (2006.01) |
| *B64C 39/02* | (2006.01) |
| *F16F 15/02* | (2006.01) |
| *H04N 5/225* | (2006.01) |
| *F16F 15/08* | (2006.01) |

(52) U.S. Cl.
CPC .......... *B64D 47/08* (2013.01); *B64C 39/024* (2013.01); *F16F 15/02* (2013.01); *G03B 15/006* (2013.01); *G03B 17/561* (2013.01); *H04N 5/2252* (2013.01); *B64C 2201/127* (2013.01); *F16F 15/08* (2013.01)

(58) Field of Classification Search
None
See application file for complete search history.

(56) References Cited

U.S. PATENT DOCUMENTS

| 5,184,521 A * | 2/1993 | Tyler .................... G01C 21/18 |
| | | 248/324 |
| 2012/0316685 A1 | 12/2012 | Pettersson |
| 2015/0336670 A1 | 11/2015 | Zhang |
| 2016/0130015 A1 * | 5/2016 | Caubel ................. B64C 27/001 |
| | | 244/120 |
| 2017/0264796 A1 * | 9/2017 | Tian ...................... B64D 47/08 |
| 2018/0346148 A1 * | 12/2018 | Zhang ................. G03B 17/561 |

(Continued)

FOREIGN PATENT DOCUMENTS

| CN | 103754377 U | 4/2014 |
| CN | 104379959 A | 2/2015 |

(Continued)

OTHER PUBLICATIONS

The World Intellectual Property Organization (WIPO) International Search Report for PCT/CN2016/072228 dated Sep. 13, 2016.

*Primary Examiner* — William B Perkey
(74) *Attorney, Agent, or Firm* — Anova Law Group, PLLC

(57) ABSTRACT

An unmanned vehicle includes a body and a gimbal assembly arranged at the body. The gimbal assembly includes a shock-absorbing structure arranged inside the body, a connecting structure arranged outside the body, and a load arranged outside the body and fixedly connected to the shock-absorbing structure via the connecting structure.

19 Claims, 10 Drawing Sheets

(56) References Cited

U.S. PATENT DOCUMENTS

| | | | |
|---|---|---|---|
| 2019/0002125 A1* | 1/2019 | Bin | F16M 13/022 |
| 2019/0011077 A1* | 1/2019 | Chen | B64D 47/08 |
| 2019/0155130 A1* | 5/2019 | Liao | B64D 47/08 |
| 2019/0162358 A1* | 5/2019 | Wang | F16M 11/18 |

FOREIGN PATENT DOCUMENTS

| | | |
|---|---|---|
| CN | 204279973 U | 4/2015 |
| CN | 204387182 U | 6/2015 |
| CN | 204452950 U | 7/2015 |
| CN | 204477173 U | 7/2015 |
| CN | 204527661 U | 8/2015 |
| CN | 204674844 U | 9/2015 |
| CN | 204776052 U | 11/2015 |
| CN | 105173100 A | 12/2015 |
| CN | 204879319 U | 12/2015 |
| CN | 204937522 U | 1/2016 |
| CN | 204956943 U | 1/2016 |
| GB | 2483881 A | 3/2012 |
| JP | S58092457 U | 6/1983 |
| JP | 2009248853 A | 10/2009 |
| JP | 2017529550 A | 10/2017 |
| WO | 2014140355 A1 | 9/2014 |

* cited by examiner

UNMANNED VEHICLE

CROSS-REFERENCE TO RELATED APPLICATION

The application is a continuation application of International Application No. PCT/CN2016/072228, filed on Jan. 26, 2016, the entire contents of which are incorporated herein by reference.

TECHNICAL FIELD

The present disclosure generally relates to a shock-absorbing structure and, more particularly, to a gimbal shock-absorbing structure, and a gimbal and unmanned vehicle using the same.

BACKGROUND

In current designs of a gimbal, a shock-absorbing assembly of the gimbal carried by an aircraft is generally arranged outside a housing of the aircraft and is connected to a shock-absorbing ball under the aircraft via a connecting wire. The design manner separates the gimbal from the aircraft, causing the gimbal and the aircraft to be not integrated while occupying a relatively large space.

SUMMARY

In accordance with the disclosure, there is provided an unmanned vehicle including a body and a gimbal assembly arranged at the body. The gimbal assembly includes a shock-absorbing structure arranged inside the body, a connecting structure arranged outside the body, and a load arranged outside the body and fixedly connected to the shock-absorbing structure via the connecting structure.

DESCRIPTION OF REFERENCE NUMERALS OF MAIN COMPONENTS

Figure 1:
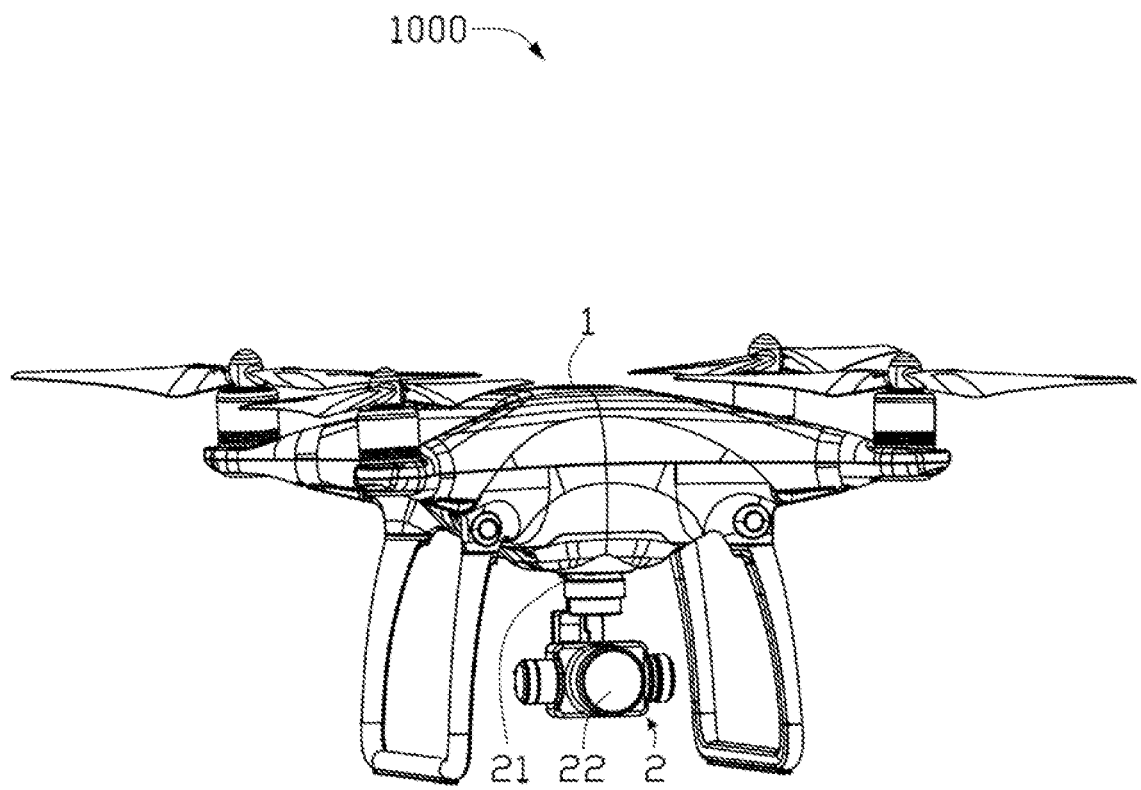
FIG. 1 is a perspective view of an unmanned vehicle according to an embodiment of the disclosure.

Unmanned Vehicle 1000
Body 1
Assembly hole 10
Gimbal assembly 2, 3
Shock-absorbing structure 20, 30
Connecting structure 21, 31
Locking hole 210, 310
Gimbal 22, 32
Load 23, 33
Positioning structure 201, 301
Moving member 200, 300
Connecting plate 2000, 3000
Fixing hole 2001, 3001
Locking device 2002, 3002
First connecting arm 2004, 3004
First distal portion 2005, 3005
First neck portion 20050, 30050
Second distal portion 2006, 3006
Second neck portion 20060, 30060
Shock-absorbing ball 202, 302
Ball portion 2020, 3020
First through hole 2021, 3021
Second through hole 2023, 3023
First fixing portion 2022, 3022
Second fixing portion 2024, 3024
Fixing member 204, 304
Positioning portion 2040, 3040
Positioning hole 2041, 3041
Fixing device 2042, 3042
Connecting portion 2043, 3043
Second connecting arm 2044, 3044
Distal end 20440, 30440
Third neck portion 20442, 30442
Limiting portion 2046, 3046

DETAILED DESCRIPTION OF EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component.

When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

FIG. 1 is a perspective view of an unmanned vehicle 1000 consistent with the disclosure. The unmanned vehicle 1000 can be an unmanned aerial vehicle (UAV), for example, a rotary-wing UAV, a fixed-wing UAV, or a UAV having both fixed-wing and rotary-wing. The rotary-wing can be a single-rotor, dual-rotor, tri-rotor, quad-rotor, hexa-rotor, octa-rotor, or the like. In some embodiments, the unmanned vehicle 100 can be an unmanned vehicle capable of moving on or in water (e.g., a driverless boat or an unmanned submarine), an unmanned vehicle capable of moving on the ground (e.g., a driverless car), an unmanned vehicle capable of moving in air (e.g., the UAV), or the like. Hereinafter, the rotary-wing UAV is taken as an example of the unmanned vehicle 1000. The unmanned vehicle 1000 includes a body 1 and a gimbal assembly 2 mounted on the body 1.

Figure 2:
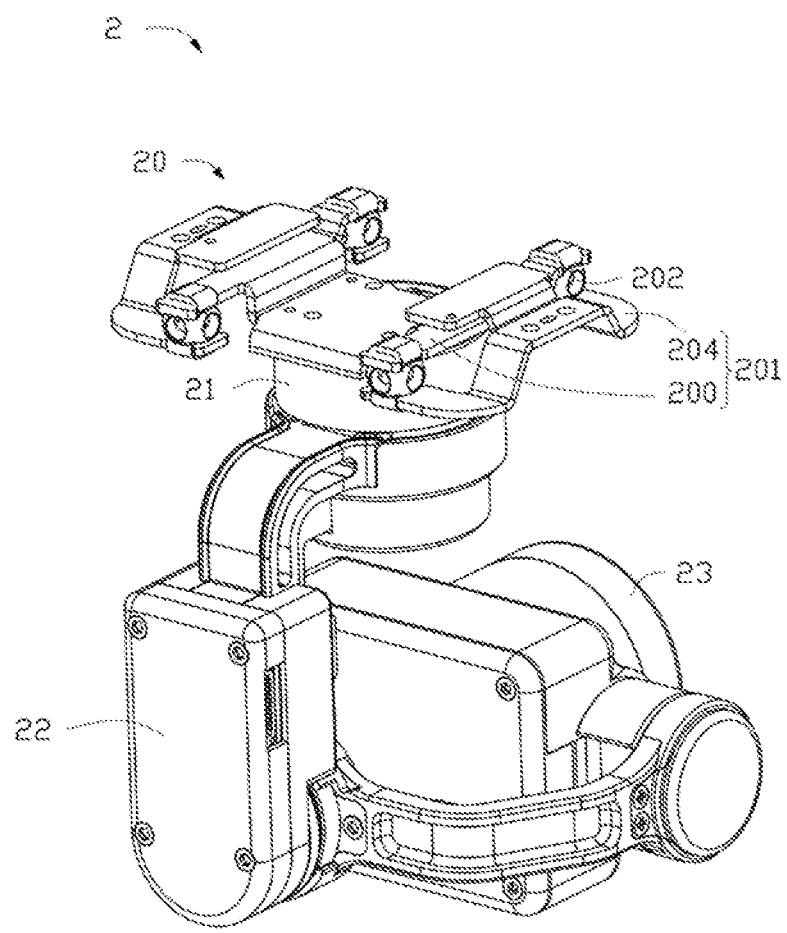
FIG. 2 is a perspective view of a gimbal assembly according to an embodiment of the disclosure.

FIG. 2 is a perspective view of the gimbal assembly 2 consistent with the disclosure. As shown in FIG. 2, the gimbal assembly 2 includes a shock-absorbing structure 20, a connecting structure 21, a gimbal 22, and a load 23. The shock-absorbing structure 20 can be arranged within the body 1. The connecting structure 21 connects the shock-absorbing structure 20 and the gimbal 22. The gimbal 22 carries the load 23 thereon. The gimbal 22 can be a single-axis gimbal, a dual-axis gimbal, or a triple-axis gimbal. The connecting structure 21, the gimbal 22, and the load 23 can be arranged outside the body 1. The load 23 can be any sensing apparatus or photographing apparatus that is suitable for being mounted on the gimbal 22. In some embodiments, the load 23 can be a photographing apparatus, such as a camera. In some embodiments, a center point of the shock-absorbing structure 20 can coincide with a center point of the gimbal assembly 2.

Figure 3:
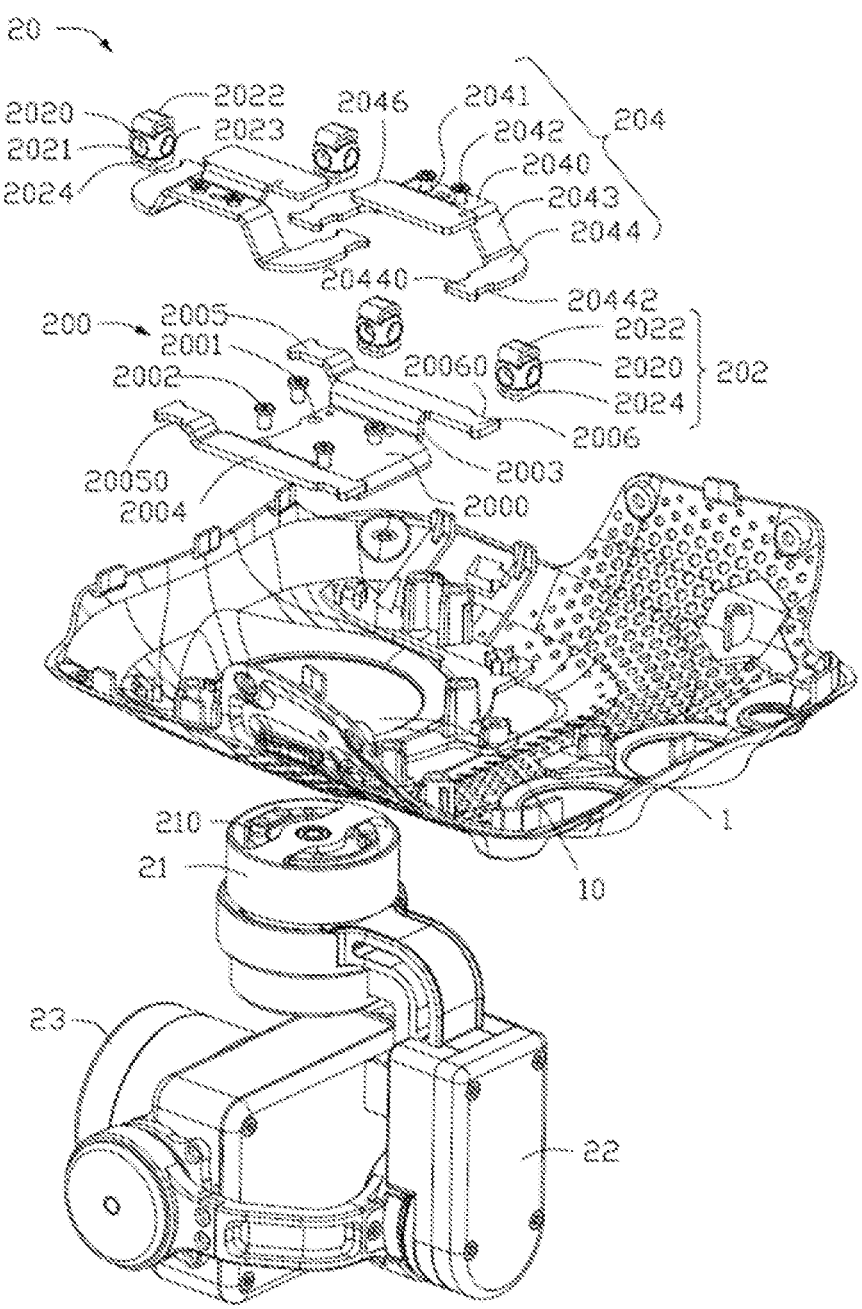
FIG. 3 is an exploded view of a gimbal assembly according to an embodiment of the disclosure.

FIG. 3 is an exploded view of the gimbal assembly 2 consistent with the disclosure. As shown in FIGS. 2 and 3, the shock-absorbing structure 20 includes a plurality of shock-absorbing balls 202 and a positioning structure 201 fixedly connecting the plurality of shock-absorbing balls 202 to the body 1. The positioning structure 201 includes a moving member 200 and two fixing members 204 configured to fix the gimbal assembly 2 inside the body 1. The two fixing members 204 are fixedly arranged inside the body 1. The plurality of shock-absorbing balls 202 connect to the moving member 200 and the two fixing members 204. The moving member 200 is fixedly connected to the connecting structure 21, and the moving member 200 can move relative to the two fixing members 204 to drive the gimbal 22 and the load 23 together to move relative to the body 1.

The moving member 200 includes a connecting plate 2000 and two first connecting arms 2004 arranged at opposite sides of the connecting plate 2000, respectively. Each first connecting arm 2004 is connected to the connecting plate 2000 through an extending portion 2003. The two first connecting arms 2004, the two extending portions 2003, and the connecting plate 2000 can be one-piece molded. In some embodiments, components of the moving member 200 can be, not one-piece molded, but fixed together using other fixing methods, such as screwing, snap-fastening, or the like. In some embodiments, a plurality of fixing holes 2001 are arranged at the connecting plate 2000, and a plurality of corresponding locking holes 210 are arranged at the connecting structure 21. A plurality of locking devices 2002 can pass through the plurality of fixing holes 2001 and the corresponding locking holes 210, such that the connecting plate 2000 can be fixedly connected to the connecting structure 21. In some other embodiments, another fixing manner, e.g., a snap fit, an interference fit, or the like, can be used, as long as the connecting plate 2000 can be fixedly connected to the connecting structure 21 and cannot move relative to the connecting structure 21.

The two extending portions 2003 are formed by extending upward from two opposite sides of the connecting plate 2000, respectively. Each first connecting arm 2004 is formed by extending from an end of the corresponding extending portion 2003 distal from the connecting plate 2000 in a direction away from the connecting plate 2000. Two ends of each first connecting arm 2004 are connected to two of the plurality of shock-absorbing balls 202, respectively. Each first connecting arm 2004 is approximately parallel to the connecting plate 2000. The two ends of each first connecting arm 2004 include a first distal portion 2005 and a second distal portion 2006, respectively. Each first distal portion 2005 or each second distal portion 2006 is connected to one of the plurality of shock-absorbing balls 202. Each first connecting arm 2004 includes a first neck portion 20050 formed near the first distal portion 2005. Each first neck portion 20050 includes two notches formed correspondingly at two sides of the first distal portion 2005. That is, a size of a first neck portion 20050 in a direction perpendicular to the first neck portion 20050 is smaller than a size of the corresponding first distal portion 2005. Each first connecting arm 2004 includes a second neck portion 20060 formed near the second distal portion 2006. Each second neck portion 20060 includes two notches formed correspondingly at two sides of the second distal portion 2006. That is, a size of a second neck portion 20060 in a direction perpendicular to the second neck portion 20060 is smaller than a size of the corresponding second distal portion 2006.

Each fixing member 204 includes a positioning portion 2040, two connecting portions 2043, two second connecting arms 2044, and a limiting portion 2046. The positioning portion 2040 is configured to fixedly connect to an inside of the body 1, such that the fixing member 204 can be fixedly arranged at an inner bottom wall of the body 1. The connecting portion 2043 is configured to connect the positioning portion 2040 to the second connecting arm 2044. The components of each fixing member 204, such as the positioning portion 2040, the two connecting portions 2043, the two second connecting arms 2044, and the limiting portion 2046, can be one-piece molded. In some other embodiments, the components of the fixing member 204 can also be separately arranged and fixed together by other fixing manners, such as screwing, snap-fastening, or the like.

The positioning portion 2040 is provided with a plurality of positioning holes 2041. A plurality of fixing devices 2042 can pass through the plurality of positioning holes 2041 to lock on the inner bottom wall of the body 1. In some embodiments, the positioning portion 2040 can also be fixedly connected to the inner bottom wall of the body 1 by other manners, such as a snap fit, an interference fit, or the like, as long as the positioning portion 2040 can be fixedly connected to the inner bottom wall of the body 1 and cannot move relative to the inner bottom wall of the body 1.

Each connecting portion 2043 is formed by extending from an end of the positioning portion 2040 toward a direction away from the positioning portion 2040. Each second connecting arm 2044 is formed by extending from an end of the connecting portion 2043 distal from the positioning portion 2040 in a direction away from the positioning portion 2040 and is approximately parallel to the positioning portion 2040. Each second connecting arm 2044 includes a distal end 20440 for connecting to one of the plurality of shock-absorbing balls 202. Each second connecting arm 2044 includes a third neck portion 20442 formed near the distal end 20440. Each third neck portion 20442 includes two notches formed correspondingly at two sides of the second connecting arm 2044. That is, a size of the third neck portion 20442 in a direction perpendicular to the third neck portion 20442 is smaller than a size of the corresponding distal end 20440. The limiting portion 2046 is formed by extending from a side of the positioning portion 2040 where the connecting portion 2043 is not arranged, and the limiting portion 2046 is approximately parallel to the positioning portion 2040 and slightly higher than the positioning portion 2040. A vertical height difference between the limiting portion 2046 and the second connecting arm 2044 is greater than a diameter of the shock-absorbing ball 202, such that the moving member 200 can move up and down in a space defined by the limiting portion 2046 and the positioning portion 2040.

Each shock-absorbing ball 202 includes a ball portion 2020, a first fixing portion 2022, and a second fixing portion 2024. The ball portion 2020 is provided with a first through hole 2021 and a second through hole 2023. An opening direction of the first through hole 2021 is approximately perpendicular to an opening direction of the second through hole 2023, and a center point of the first through hole 2021 and a center point of the second through hole 2023 coincide with the center point of the shock-absorbing ball 202. Opening a plurality of through holes in the ball portion 2020 can achieve a better shock absorbing effect. The ball portion 2020 can be made of an elastic material. The first fixing portion 2022 is configured to connect to the first distal portion 2005 or the second distal portion 2006 of the corresponding first connecting arm 2004 of the moving member 200. The second fixing portion 2024 is configured to connect to the corresponding fixing member 204. The first fixing portion 2022 is a sleeve made of an elastic material and can be sleeved on the first distal portion 2005 or the second distal portion 2006 to fixedly connect the shock-absorbing ball 202 to the moving member 200. The second fixing portion 2024 is similar to the first fixing portion 2022 and is also a sleeve made of an elastic material and can be sleeved on the distal end 20440 to fixedly connect the shock-absorbing ball 202 to the corresponding fixing member 204. The sleeve direction of the first fixing portion 2022 is approximately perpendicular to the sleeve direction of the second fixing portion 2024. In some other embodiments, the sleeve direction of the first fixing portion 2022 and the sleeve direction of the second fixing portion 2024 is not limited to be perpendicular to each other, and may be, for example, parallel to each other or in another positional relationship. The sleeve directions need to be set in accordance with the extending directions of the first distal portion 2005, the second distal portion 2006, and the distal end 20440. It should be appreciated that the first fixing portion 2022 and the second fixing portion 2024 are provided in the sleeve shape for illustration and ease of installation. The elastic material is intended for further absorbing the shock. In some other embodiments, the first fixing portion 2022 and the second fixing portion 2024 can be made of another material and have another structure, as long as the shock-absorbing ball 202 can be fixedly connected to the moving member 200 and the corresponding fixing member 204. For example, the shock-absorbing ball 202 can be fixedly connected to the moving member 200 and the corresponding fixing member 204 by a snap fit or the like.

Figure 4:
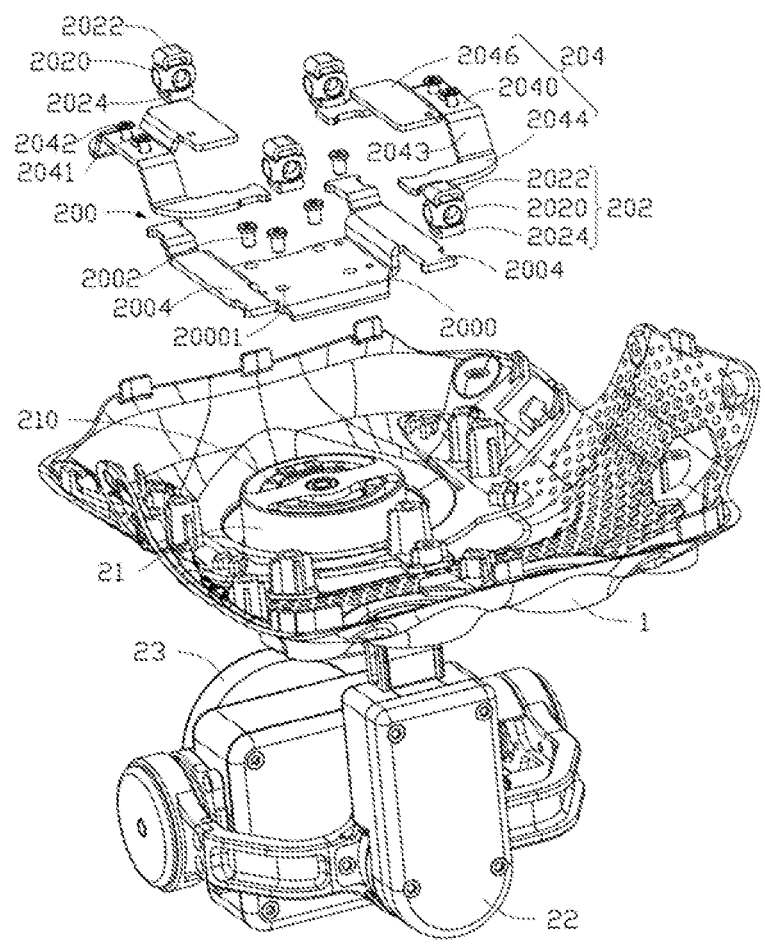
FIG. 4 schematically shows assembling the gimbal assembly in FIG. 3 to a body of an unmanned vehicle according an embodiment of the disclosure.

FIG. 4 schematically shows assembling the gimbal assembly 2 in FIG. 3 to the body 1 of the unmanned vehicle 100 consistent with the disclosure. As shown in FIGS. 3 and 4, when the gimbal assembly 2 is being assembled to the body 1 of the unmanned vehicle 1000, the first fixing portion 2022 and the second fixing portion 2024 of a shock-absorbing ball 202 are respectively sleeved on the first neck portion 20050 or the second neck portion 20060 of the corresponding first connecting arm 2004 of the moving member 200 and the third neck portion 20442 of the corresponding second connecting arm 2044 of the corresponding fixing member 204, such that the shock-absorbing ball 202 can be fixedly connected between the moving member 200 and the corresponding fixing member 204. The two fixing members 204 can be fixedly connected to the inner bottom wall of the body 1 using the plurality of fixing devices 2042. The connecting structure 21 is fixedly connected to the connecting plate 2000 through a mounting hole 10 provided at the body 1, such that the gimbal assembly 2 can be assembled on the body 1.

Figure 5:
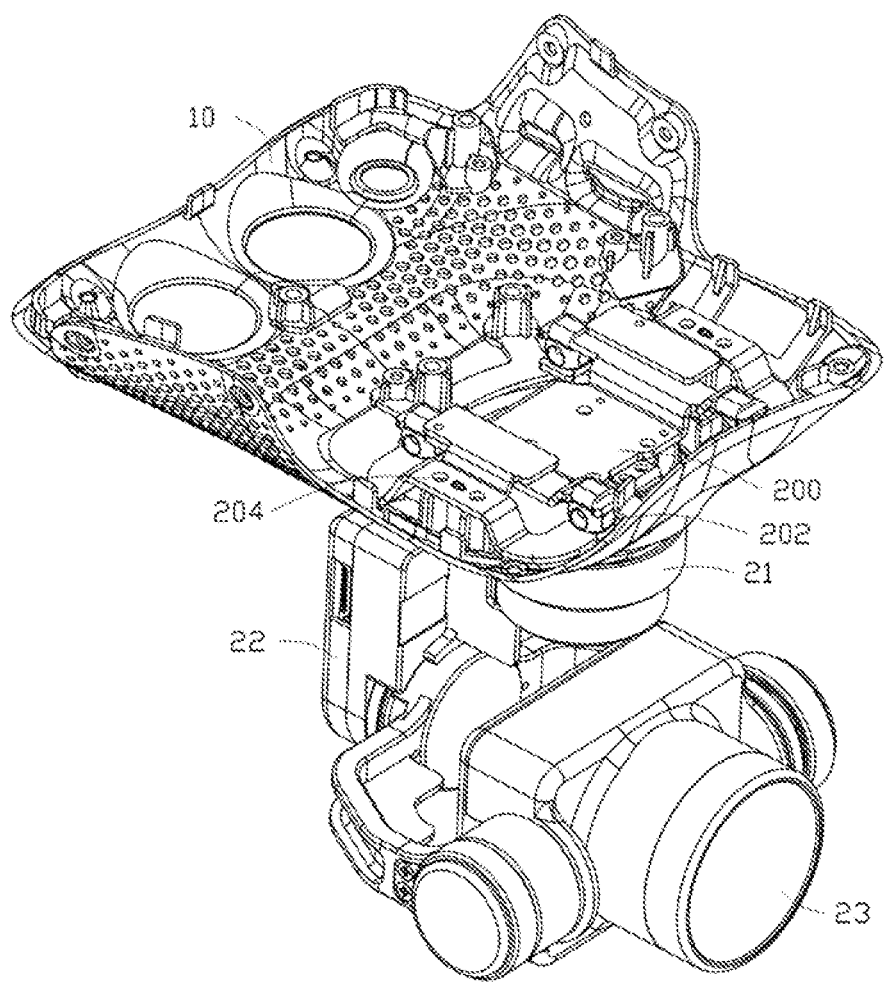
FIG. 5 schematically shows the gimbal assembly in FIG. 3 assembled to the body of the unmanned vehicle.
Figure 6:
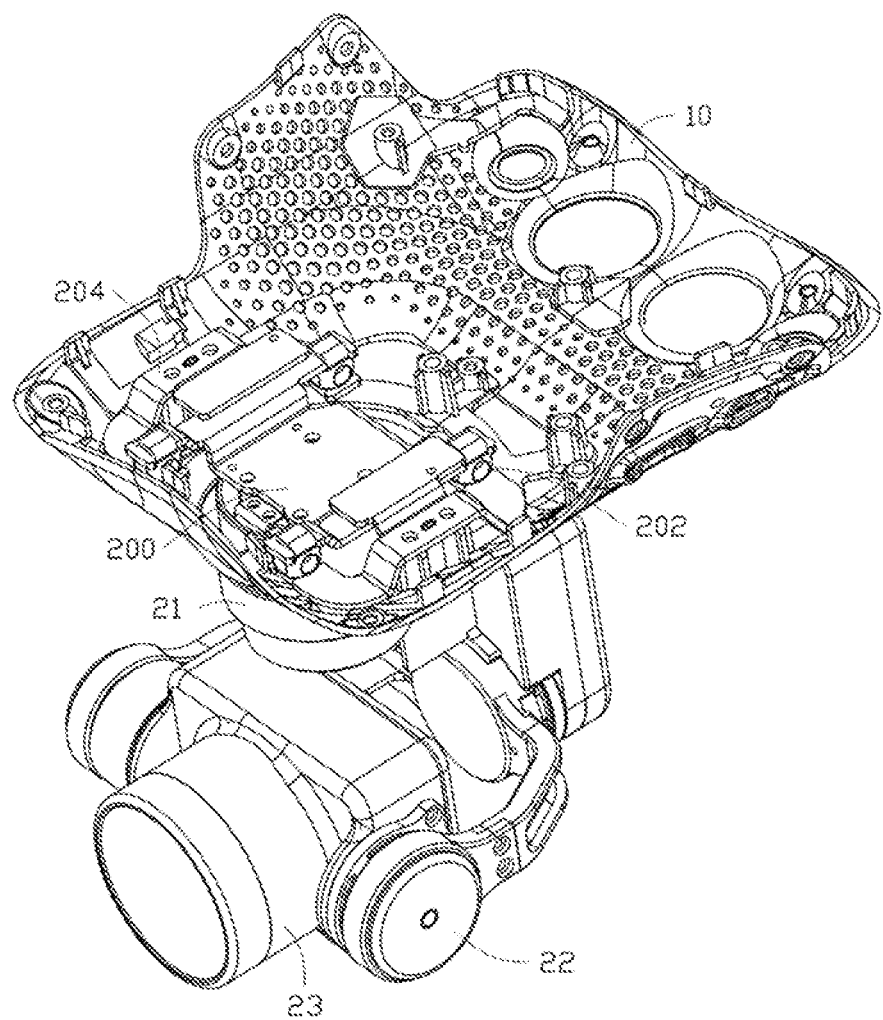
FIG. 6 is a view of FIG. 5 from another angle.

FIG. 5 schematically shows the gimbal assembly 2 in FIG. 3 assembled to the body 1 of the unmanned vehicle 1000 consistent with the disclosure. FIG. 6 is a view of the assembled structure from another angle.

After the assembly is completed, as shown in FIGS. 5 and 6, the moving member 200 and the two fixing members 204 are connected by the plurality of shock-absorbing balls 202. The plurality of shock-absorbing balls 202 are made of an elastic material, and each shock-absorbing ball 202 is provided with the first through hole 2021 and the second through hole 2023, such that the moving member 200 can move relative to the two fixing members 204 and can return to an initial position under an elastic force of the plurality of shock-absorbing balls 202. A distance between the two limiting portions 2046 is greater than a distance between inner sides of the two first connecting arms 2004 (i.e., sides of the two first connecting arms 2004 close to the connecting plate 2000) and is less than a distance between outer sides of the two first connecting arms 2004 (i.e., sides of the two first connecting arms 2004 distal from the connecting plate 2000). Therefore, the two limiting portions 2046 of the two fixing members 204 can limit a moving range of the moving member 200 in a direction perpendicular to the bottom wall of the body 1 to prevent the moving range of the moving member 200 from being too large to affect other members assembled in the body 1, and to prevent a tension on the plurality shock-absorbing balls 202 from being too large to damage the elasticity of the plurality of shock-absorbing balls 202. During a movement of the unmanned vehicle 1000, if the gimbal 22 and the load 23 move relative to the body 1, a vibration generated by the movement is transmitted to the two fixing members 204. The body 1 is connected to the two fixing members 204 via the plurality of shock-absorbing balls 202. Due to the shock absorbing effect of the plurality of shock-absorbing balls 202, the influence of the vibration on the body 1 can be greatly reduced.

Figure 7:
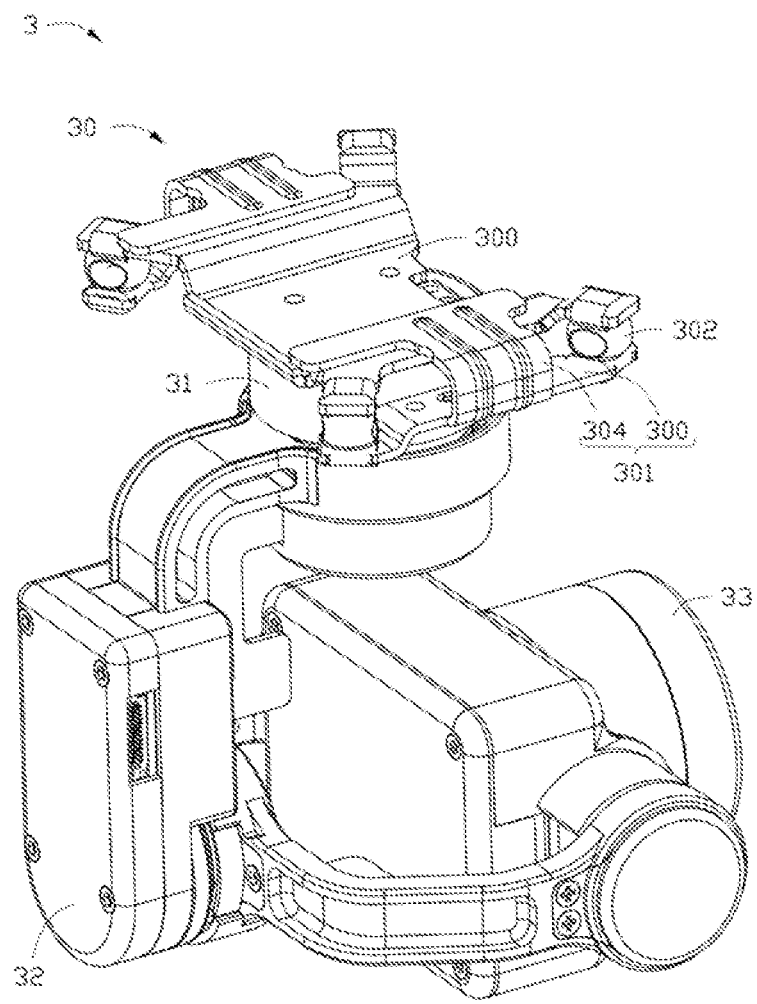
FIG. 7 is a perspective view of another gimbal assembly according to an embodiment of the disclosure.

FIG. 7 is a perspective view of a gimbal assembly 3 consistent with the disclosure. As shown in FIG. 7, the gimbal assembly 3 includes a shock-absorbing structure 30, a connecting structure 31, a gimbal 32, and a load 33. The shock-absorbing structure 30 can be arranged inside the body 1. The connecting structure 31 connects the shock-absorbing structure 30 and the gimbal 32. The load 33 is provided at the gimbal 32. The gimbal 32 can be a single-axis gimbal, a dual-axis gimbal, or a triple-axis gimbal. The connecting structure 31, the gimbal 32, and the load 33 can be arranged outside the body 1. The load 33 can be any sensing apparatus or photographing apparatus that is suitable for being mounted on the gimbal 32. In some embodiments, the load 33 is a photographing apparatus, such as a camera. In some embodiments, a center point of the shock-absorbing structure 30 of the gimbal coincides with a center point of the gimbal assembly 3.

Figure 8:
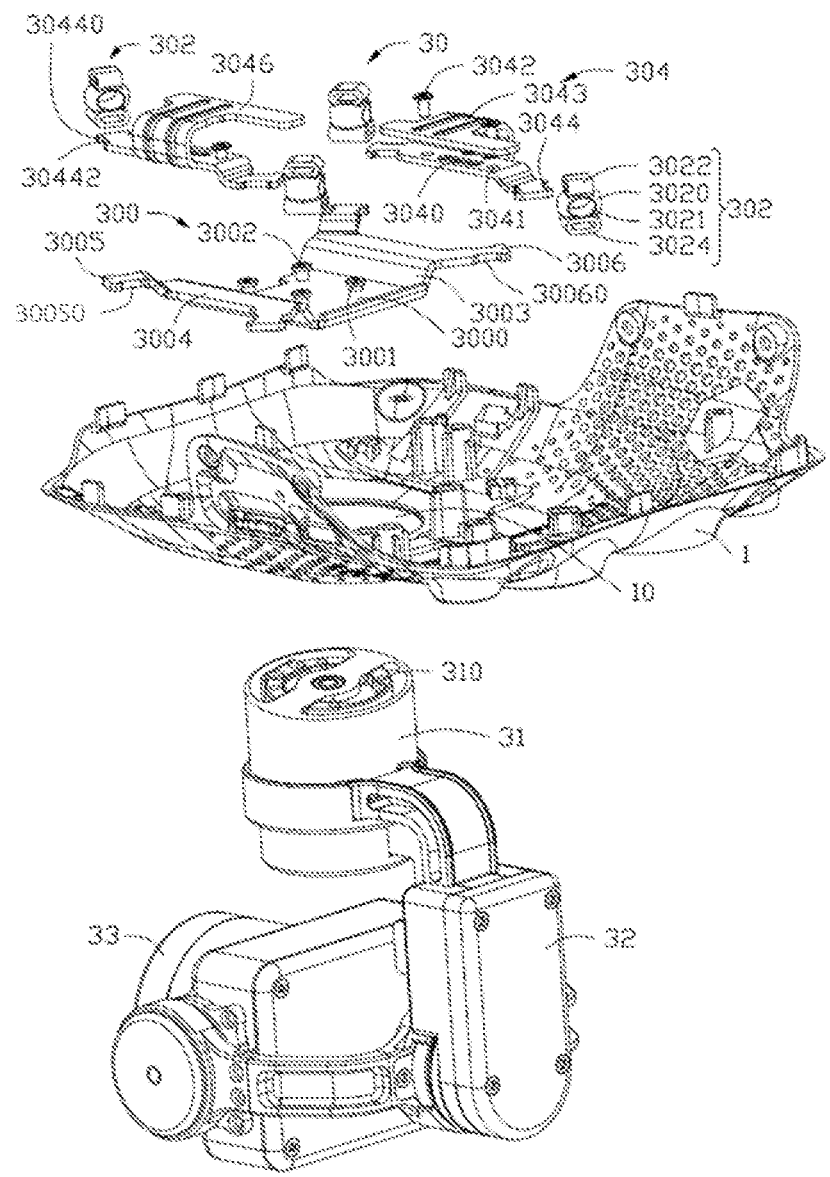
FIG. 8 is an exploded view of the gimbal assembly in FIG. 7.

FIG. 8 is an exploded view of the gimbal assembly 3 in FIG. 7 consistent with the disclosure. As shown in FIGS. 7 and 8, the shock-absorbing structure 30 includes a plurality of shock-absorbing balls 302 and a positioning structure 301 fixedly connecting the plurality of shock-absorbing balls 302 to the body 1. The positioning structure 301 includes a moving member 300 and two fixing members 304. The moving member 300 is fixedly connected to the connecting structure 31, and the moving member 300 can move relative to the two fixing members 304 to drive the gimbal 32 and the load 33 together to move relative to the body 1.

The moving member 300 is similar to the moving member 200 and includes a connecting plate 3000 and two first connecting arms 3004 arranged at opposite sides of the connecting plate 3000. Each first connecting arm 3004 is connected to the connecting plate 3000 through an extending portion 3003. The two first connecting arms 3004, the two extending portions 3003, and the connecting plate 3000 can be one-piece molded. Each first connecting arm 3004 is approximately parallel to the connecting plate 3000. Each first connecting arm 3004 includes a first distal portion 3005 and a second distal portion 3006. Each first distal portion 3005 or each second distal portion 3006 is connected to one of the plurality of shock-absorbing balls 302. A distance between the first distal portion 3005 and the second distal portion 3006 of each first connecting arm 3004 gradually increases from the connecting plate 3000 in the direction away from the connecting plate 3000. In some embodiments, the two first distal portions 3005 and the two second distal portions 3006 are symmetrically arranged with respect to a center of the moving member 300, such that the plurality of shock-absorbing balls connected to the two first distal portions 3005 and the two second distal portions 3006 can be symmetrically arranged with respect to a center of the gimbal assembly 3 to balance and mitigate the vibration of the body 1 caused by the motion of the gimbal 32 and the load 33. In some embodiments, the two first distal portions 3005 and the two second distal portions 3006 can be evenly distributed on a circle centered on the center of the moving member 300, such that the plurality of shock-absorbing balls can be evenly distributed on a circle centered on the center of the gimbal assembly 3 to balance and mitigate the shock of the body 1 caused by the motion of the gimbal 32 and the load 33.

The connecting plate 3000 is fixedly connected to the connecting structure 31. In some embodiments, a plurality of fixing holes 3001 are arranged at the connecting plate 3000, and a plurality of corresponding locking holes 210 are arranged at the connecting structure 31. A plurality of locking devices 3002 can pass through the plurality of fixing holes 3001 and the corresponding locking holes 310, such that the connecting plate 3000 can be fixedly connected to the connecting structure 31. In some other embodiments, another fixing manner, e.g., a snap fit, an interference fit, or the like, can be used, as long as the connecting plate 3000 can be fixedly connected to the connecting structure 31 and cannot move relative to the connecting structure 31.

The two extending portions 3003 are formed by extending upward from two opposite sides of the connecting plate 3000, respectively. Each first connecting arm 3004 is formed by extending from an end of the corresponding extending portion 3003 distal from the connecting plate 3000 in a direction away from the connecting plate 3000. Each first connecting arm 3004 is approximately parallel to the connecting plate 3000. Each first connecting arm 3004 includes a first neck portion 30050 formed near the first distal portion 3005. The first neck portion 30050 includes two notches formed correspondingly at two sides of the first distal portion 3005. That is, a size of the first neck portion 30050 in a direction perpendicular to the first neck portion 30050 is smaller than a size of the corresponding first distal portion 3005. Each first connecting arm 3004 includes a second neck portion 30060 formed near the second distal portion 3006. The second neck portion 30060 includes two notches formed at two sides corresponding to the second distal portion 3006. That is, a size of the second neck portion 30060 in a direction perpendicular to the second neck portion 30060 is smaller than a size of the corresponding second distal portion 3006.

Each fixing member 304 includes a positioning portion 3040, a connecting portion 3043, two second connecting arms 3044, and a limiting portion 3046. The components of each fixing device 304, such as the positioning portion 3040, the connecting portion 3043, the two second connecting arms 3044, and the limiting portion 3046, can be one-piece molded. In some other embodiments, the components of a fixing member 304 can also be separately arranged and fixed together by other fixing manners, such as screwing, snap-fastening, or the like.

The positioning portion 3040 is configured to fixedly connect to an inside of the body 1, such that the fixing member 304 can be fixedly arranged at an inner bottom wall of the body 1. The positioning portion 3040 is provided with a plurality of positioning holes 3041. A plurality of fixing devices 3042 can pass through the plurality of positioning holes 3041 to lock on the inner bottom wall of the body 1. In some embodiments, the positioning portion 3040 can also be fixedly connected to the inner bottom wall of the body 1 by another manner, such as a snap fit, an interference fit, or the like, as long as the positioning portion 3040 can be fixedly connected to the inner bottom wall of the body 1 and cannot move relative to the inner bottom wall of the body 1.

The connecting portion 3043 is formed by extending from an end of the positioning portion 3040 toward a direction away from the positioning portion 3040. The connecting portion 3043 has a C-shape-like structure for connecting the positioning portion 3040 and the limiting portion 3046. A width of the connecting portion 3043 in a radial direction of the positioning portion 3040 is smaller than a width of the positioning portion 3040, thereby facilitating the installation of the plurality of fixing devices 3042.

Each second connecting arm 3044 is formed by extending from an end of the positioning portion 3040 distal from the positioning portion 3040 in a direction away from the positioning portion 3040 and approximately parallel to the positioning portion 3040. The second connecting arm 3044 is slightly lower than the positioning portion 3040. Corresponding to the first distal portion 3005 and the second distal portion 3006 of each first connecting arm 3004, a distance between the two second connecting arms 3044 gradually increases from the positioning portion 3040 in the direction away from the positioning portion 3040. Each second connecting arm 3044 includes a distal end 30440 for connecting to one of the plurality of shock-absorbing balls 302. Each second connecting arm 3044 includes a third neck portion 30442 formed near the distal end 30440. Each third neck portion 30442 includes two notches formed correspondingly at two sides of the distal end 30440. That is, a size of a third neck portion 30442 in a direction perpendicular to the third neck portion 30442 is smaller than a size of the corresponding distal end 30440.

The limiting portion 3046 is formed by extending from a side of the connecting portion 3043 distal from the position portion 3040 in a direction parallel to the second connecting arm 3044. A length of the limiting portion 3046 in a radial direction is greater than a width of the connecting portion 3043 in the radial direction, and the length of the limiting portion 3046 in the radial direction is greater than a distance between the two first connecting arms 3004, such that a moving range of the moving member 300 in a direction perpendicular to the positioning portion 3040 can be limited. A vertical distance between the limiting portion 3046 and the second connecting arm 3044 is greater than a diameter of a shock-absorbing ball 302.

Each shock-absorbing ball 302 includes a ball portion 3020, a first fixing portion 3022, and a second fixing portion 3024. The ball portion 3020 is provided with a first through hole 3021. A center point of the first through hole 3021 coincides with the center point of the shock-absorbing ball 302. The ball portion 3020 can be made of an elastic material. The first fixing portion 3022 is configured to connect to the first distal portion 3005 or the second distal portion 3006 of the corresponding first connecting arm 3004 of the moving member 300. The second fixing portion 3024 is configured to connect to the corresponding fixing member 304. The first fixing portion 3022 is a sleeve made of an elastic material and can be sleeved on the first neck portion 30050 or the second neck portion 30060 to fixedly connect the shock-absorbing ball 302 to the moving member 300. The second fixing portion 3024 is similar to the first fixing portion 3022 and is also a sleeve made of an elastic material and can be sleeved on the third neck portion 30442 to fixedly connect the shock-absorbing ball 202 to the corresponding fixing member 304. The sleeve direction of the first fixing portion 3022 is approximately perpendicular to the sleeve direction of the second fixing portion 3024. In some other embodiments, the sleeve direction of the first fixing portion 3022 and the sleeve direction of the second fixing portion 3024 is not limited to be perpendicular to each other, and may be, for example, parallel to each other or in another positional relationship. The sleeve directions need to be set in accordance with the extending direction of the first distal portion 3005, the second distal portion 3006, and the distal end 30440. It should be appreciated that the first fixing portion 3022 and the second fixing portion 3024 are provided in the sleeve shape for illustration and ease of installation. The elastic material is intended for further absorbing the shock. In some other embodiments, the first fixing portion 3022 and the second fixing portion 3024 can be made of another material and have another structure, as long as the shock-absorbing ball 302 can be fixedly connected to the moving member 300 and the corresponding fixing member 304. For example, each shock-absorbing ball 302 can be fixedly connected to the moving member 300 and the corresponding fixing member 304 by a snap fit or the like.

As shown in FIG. 8, when the gimbal assembly 3 is being assembled to the body 1 of the unmanned vehicle 1000, the first fixing portion 3022 and the second fixing portion 3024 of each shock-absorbing ball 302 are respectively sleeved on the first neck portion 30050 or the second neck portion 30060 of the corresponding first connecting arm 3004 of the moving member 300 and the third neck portion 30442 of the corresponding second connecting arm 3044 of the corresponding fixing member 304, such that the shock-absorbing ball 302 can be fixedly connected between the moving member 300 and the corresponding fixing member 304. The two fixing member 304 can be fixedly connected to the inner bottom wall of the body 1 using the plurality of fixing devices 3042. The connecting structure 31 is fixedly connected to the connecting plate 3000 through a mounting hole 10 provided at the body 1, such that the gimbal assembly 3 can be assembled on the body 1.

Figure 9:
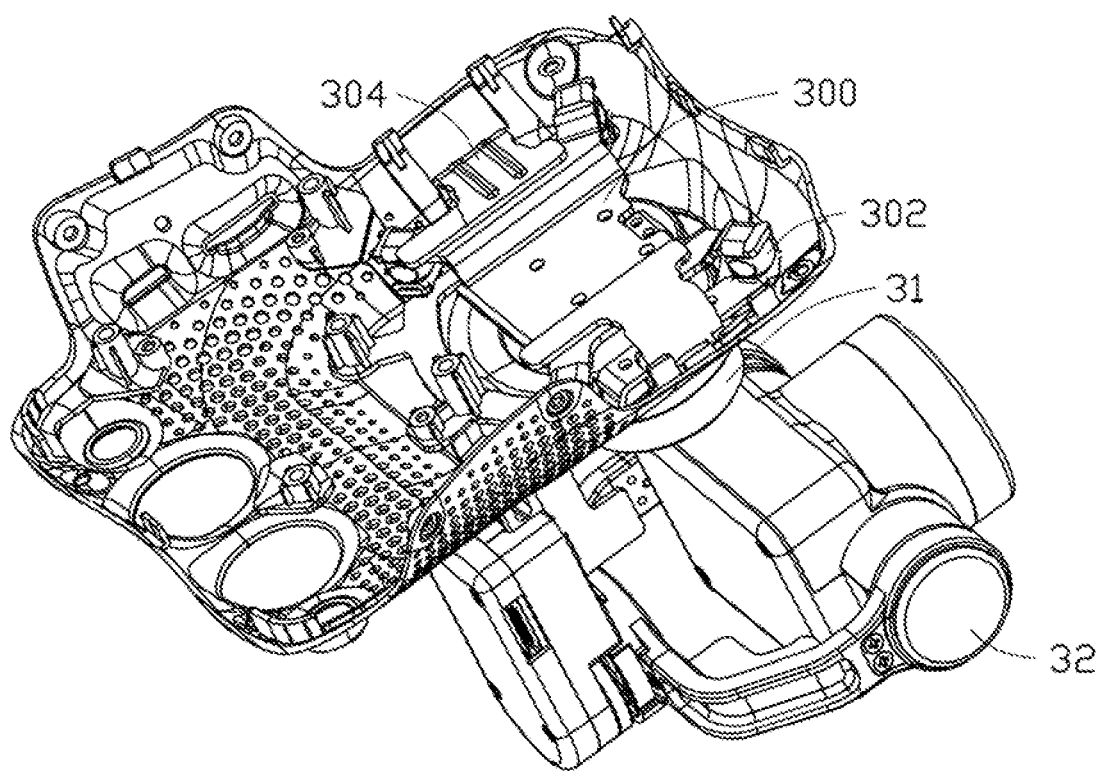
FIG. 9 schematically shows the gimbal assembly in FIG. 7 assembled to a body of an unmanned vehicle.

FIG. 9 schematically shows the gimbal assembly 3 in FIG. 7 assembled to the body 1 of the unmanned vehicle 1000 consistent with the disclosure.

After the assembly is completed, as shown in FIG. 9, the moving member 300 and the two fixing members 304 are connected by the plurality of shock-absorbing balls 302. The plurality of shock-absorbing balls 302 are made of an elastic material, and each shock-absorbing ball 302 is provided with the first through hole 3021, such that the moving member 300 can move relative to the two fixing members 304. A distance between the two limiting portions 3046 is greater than a distance between inner sides of the two first connecting arms 3004 (i.e., sides of the two first connecting arms 3004 close to the connecting plate 3000) and is less than a distance between outer sides of the two first connecting arms 3004 (i.e., sides of the two first connecting arms 3004 distal from the connecting plate 3000). Therefore, the two limiting portions 3046 of the two fixing members 304 can limit a moving range of the moving member 300 in a direction perpendicular to the bottom wall of the body 1 to prevent the moving range of the moving member 300 from being too large to affect other members assembled in the body 1, and to prevent a tension on the plurality shock-absorbing balls 302 from being too large to damage the elasticity of the plurality of shock-absorbing balls 302.

Figure 10:
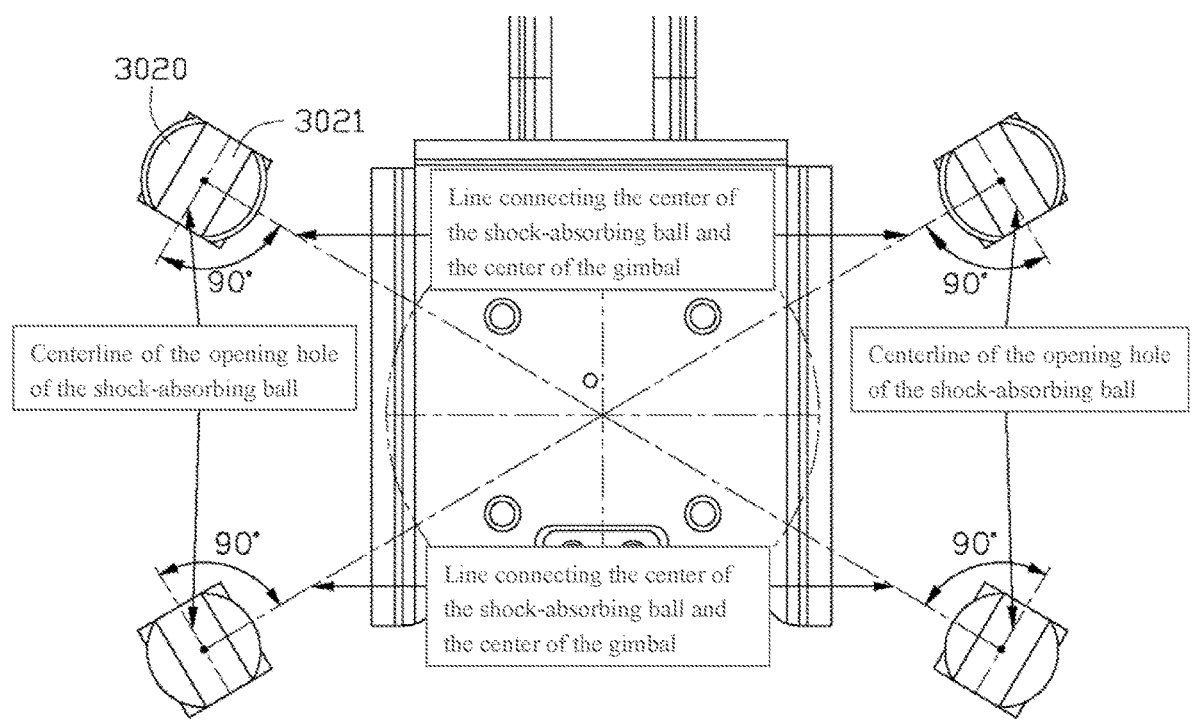
FIG. 10 schematically shows an opening direction of a through hole of a shock-absorbing ball of the gimbal assembly in FIG. 7.

FIG. 10 schematically shows an opening direction of the first through hole 3021 of the ball portion 3020 of each shock-absorbing ball 302 of the gimbal assembly 3 shown in FIG. 7. The plurality of shock-absorbing balls 302 are evenly distributed on a circle centered on a center point O of the gimbal assembly 3, such that the degree of shock absorbing of the gimbal assembly 3 in all directions can be more even. In order to achieve a better shock-absorbing effect, the ball portion 3020 is provided with the first through hole 3021, a line connecting a center point $O_1$ of the first through hole 3021 and the center point O of the gimbal assembly 3 is perpendicular to a centerline of the opening direction of the first through hole 3021. The above-described arrangement of the position of the plurality of shock-absorbing balls 302 and the opening direction of the first through hole 3021 can obtain a better shock-absorbing effect.

In some embodiments, as shown in FIGS. 2 to 6, when two through holes are provided, the opening direction of one of the two through holes, for example, the first through hole 2021, can be set as the direction shown in FIG. 10, and the opening direction for another through hole, for example, the second through hole 2023, can be set to be perpendicular to the opening direction of the first through hole 2021, such that a better shock-absorbing effect of the shock-absorbing ball 202 can be achieved.

In some embodiments, as shown in FIGS. 2 to 6, the plurality of shock-absorbing balls 202 can be symmetrically arranged with respect to the center of the gimbal assembly 2, such that the plurality of shock-absorbing balls 202 can balance and mitigate the vibration of body 1 caused by the motion of the gimbal 22 and the load 23. In some embodiments, the plurality of shock-absorbing balls 202 can be evenly distributed on a circle centered on the center point of the gimbal assembly 2, such that the shock-absorbing balls 202 can more evenly balance and mitigate the vibration of body 1 caused by the motion of the gimbal 22 and the load 23.

In some embodiments, the two fixing members 204 shown in FIGS. 2 to 6 can be interchanged with the two fixing members 304 shown in FIGS. 7 to 9. In some other embodiments, the two fixing members 204 (or 304) can also have any other suitable structure as long as the plurality of shock-absorbing balls 202 (or 302) can be fixed to the body 1, and the moving range of the moving member 200 (or 300)

can be limited in at least one direction. It can be appreciated that the limiting portion 2046 (or 3046) and/or the two connecting portions 2043 (or 3043) can be fixed to the body 1 independently of the two second connecting arms 2044 (or 3044).

In some embodiments, the manner of connecting the first fixing portion 2022 (or 3022) to the corresponding first connecting arm 2004 (or 3004), and the manner of connecting the second fixing portion 2024 (or 3024) to the corresponding second connecting arm 2044 (or 3044) are not limited to the above-described manners. For example, an elastic fixing member can be provided at each first connecting arm 2004 (or 3004), the first fixing portion 2022 (or 3022) can be an elastic sheet or a non-elastic sheet, and the first fixing portion 2022 (or 3022) can be fixed to the corresponding first connecting arm 2004 (or 3004) by connecting the elastic fixing member to the elastic sheet or the non-elastic sheet. As another example, an engaging structure can be arranged at each first connecting arm 2004 (or 3004) or each second connecting arm 2044 (or 3044), and the first fixing portion 2022 (or 3022) or the second fixing portion 2024 (or 3024) can be engaged on the corresponding fixing member 204 (or 304).

Various changes and modifications can be made by those skilled in the art on the basis of the technique concept of the present disclosure, which should fall within the scope of the present disclosure.

What is claimed is:

1. An unmanned vehicle comprising:
    a body; and
    a gimbal assembly arranged at the body and including:
        a shock-absorbing structure arranged inside the body, the shock-absorbing structure including a plurality of shock-absorbing balls arranged symmetrically with respect to a symmetry center, and each of the plurality of shock-absorbing balls including a through hole;
        a connecting structure arranged outside the body;
        a gimbal coupled to the connecting structure; and
        a load arranged outside the body, carried by the gimbal, and fixedly connected to the shock-absorbing structure via the connecting structure,
    wherein a line connecting a center of the gimbal and the symmetry center is perpendicular to a centerline of an opening direction of the through hole of each of the plurality of shock-absorbing balls.

2. The unmanned vehicle of claim 1, wherein the shock-absorbing structure further includes:
    a positioning structure fixedly connecting the plurality of shock-absorbing balls to the body and including:
        a fixing member fixedly connected to an end of each of the plurality of shock-absorbing balls and the body; and
        a moving member fixedly connected to another end of each of the plurality of shock-absorbing balls and the gimbal.

3. The unmanned vehicle of claim 2, wherein:
    a center of the through hole of each of the plurality of shock-absorbing balls coincides with a center of the corresponding one of the plurality of shock-absorbing balls.

4. The unmanned vehicle of claim 3, wherein:
    a line connecting the center of the through hole of each of the plurality of shock-absorbing balls and the symmetry center is perpendicular to the centerline of the opening direction of the through hole.

5. The unmanned vehicle of claim 4, wherein:
    the through hole is a first through hole;
    each of the plurality of shock-absorbing balls further includes a second through hole;
    a center of the second through hole of each of the plurality of shock-absorbing balls coincides with the center of the corresponding one of the plurality of shock-absorbing balls; and
    an opening direction of the second through hole is perpendicular to the opening direction of the first through hole.

6. The unmanned vehicle of claim 3, wherein:
    the plurality of shock-absorbing balls are evenly distributed on a circle centered on the symmetry center.

7. The unmanned vehicle of claim 3, wherein:
    the through hole is a first through hole;
    each of the plurality of shock-absorbing balls further includes a second through hole;
    a center of the second through hole of each of the plurality of shock-absorbing balls coincides with the center of the corresponding one of the plurality of shock-absorbing balls; and
    an opening direction of the second through hole is perpendicular to the opening direction of the first through hole.

8. The unmanned vehicle of claim 2, wherein the moving member includes:
    a connecting plate fixedly connected to the gimbal; and
    a plurality of connecting arms each extending from a side of the connecting plate, a distal portion of each of the plurality of connecting arms being connected to one of the plurality of shock-absorbing balls.

9. The unmanned vehicle of claim 8, wherein:
    the distal portion includes a neck portion;
    each of the plurality of shock-absorbing balls includes an elastic sleeve; and
    the elastic sleeve is sleeved on the neck portion.

10. The unmanned vehicle according to claim 8, wherein:
    the connecting plate is fixedly connected to the gimbal via a connecting structure.

11. The unmanned vehicle according to claim 10, wherein:
    the connecting plate includes a fixing hole;
    the connecting structure includes a locking hole; and
    the connecting plate is locked to the connecting structure by a locking device passing through the fixing hole and the locking hole.

12. The unmanned vehicle of claim 9, wherein:
    the plurality of connecting arms are a plurality of first connecting arms; and
    the fixing member includes:
        a positioning portion fixedly connected to the body;
        a plurality of connecting portions each extending from a side of the positioning portion;
        a plurality of second connecting arms each extending from an end of one of the plurality of connecting portions distal from the positioning portion, a distal end of each of the plurality of second connecting arms being connected to one of the plurality of shock-absorbing balls; and
        a limiting portion fixedly connected to the positioning portion and approximately parallel to the positioning portion.

13. The unmanned vehicle of claim 12, wherein:
    the plurality of first connecting arms include two first connecting arms extending from opposite sides of the connecting plate;

a length of one of the plurality of second connecting arms is greater than a distance between inner sides of the two first connecting arms and is less than a distance between outer sides of the two first connecting arms.

14. The unmanned vehicle of claim 12, wherein:

the elastic sleeve is a first elastic sleeve;

each of the plurality of shock-absorbing balls includes a second elastic sleeve; and the second elastic sleeve is sleeved on a neck portion provided at the distal end of the corresponding one of the plurality of second connecting arms.

15. The unmanned vehicle of claim 9, wherein:

the plurality of connecting arms are a plurality of first connecting arms; and the fixing member includes:
- a positioning portion fixedly connected to the body;
- a plurality of connecting portions each extending from a side of the positioning portion;
- a plurality of second connecting arms each extending from an end of the positioning portion, a distal end of each of the plurality of second connecting arms being connected to one of the plurality of shock-absorbing balls; and
- a limiting portion extending from an end of the connecting portion and approximately parallel to the positioning portion.

16. The unmanned vehicle of claim 15, wherein:

the plurality of first connecting arms include two first connecting arms extending from opposite sides of the connecting plate;

a length of one of the plurality of second connecting arms is greater than a distance between inner sides of the two first connecting arms and is less than a distance between outer sides of the two first connecting arms.

17. The unmanned vehicle of claim 15, wherein:

a vertical distance between the limiting portion and one of the plurality of second connecting arms is greater than a diameter of each of the plurality of shock-absorbing balls.

18. The unmanned vehicle of claim 15, wherein:

the elastic sleeve is a first elastic sleeve;

each of the plurality of shock-absorbing balls includes a second elastic sleeve; and the second elastic sleeve is sleeved on a neck portion provided at the distal end of the corresponding one of the plurality of second connecting arms.

19. The unmanned vehicle of claim 8, wherein:

the distal portion is one of two distal portions of each of the plurality of connecting arms; and a distance between the two distal portions gradually increases from the connecting plate in a direction away from the connecting plate.

\* \* \* \* \*